(12) United States Patent
Tanaka et al.

(10) Patent No.: US 10,839,706 B2
(45) Date of Patent: Nov. 17, 2020

(54) MOTION TRAINING DEVICE, PROGRAM, AND DISPLAY METHOD

(71) Applicant: Seiko Epson Corporation, Tokyo (JP)

(72) Inventors: Hideki Tanaka, Chino (JP); Yuya Maruyama, Kai (JP)

(73) Assignee: Seiko Epson Corporation (JP)

( * ) Notice: Subject to any disclaimer, the term of this patent is extended or adjusted under 35 U.S.C. 154(b) by 360 days.

(21) Appl. No.: 15/717,162

(22) Filed: Sep. 27, 2017

(65) Prior Publication Data

US 2018/0096615 A1 Apr. 5, 2018

(30) Foreign Application Priority Data

Sep. 30, 2016 (JP) .................................. 2016-192596

(51) Int. Cl.
| | | |
|---|---|---|
| *G09B 5/02* | (2006.01) | |
| *G09B 19/00* | (2006.01) | |
| *G06T 7/20* | (2017.01) | |
| *H04N 7/18* | (2006.01) | |
| *G06K 9/00* | (2006.01) | |
| *G06K 9/46* | (2006.01) | |
| *G06F 3/01* | (2006.01) | |
| *G06F 1/16* | (2006.01) | |

(52) U.S. Cl.
CPC .............. *G09B 5/02* (2013.01); *G06F 1/163* (2013.01); *G06F 3/011* (2013.01); *G06F 3/017* (2013.01); *G06K 9/00355* (2013.01); *G06K 9/00389* (2013.01); *G06K 9/00671* (2013.01); *G06K 9/4604* (2013.01); *G06T 7/20* (2013.01); *G09B 19/003* (2013.01); *H04N 7/183* (2013.01); *H04N 7/185* (2013.01)

(58) Field of Classification Search
CPC ............................... G09B 19/003; G09B 5/02
See application file for complete search history.

(56) References Cited

U.S. PATENT DOCUMENTS

2002/0164567 A1* 11/2002 Katayama .......... A63B 24/0003
434/252
2007/0282228 A1* 12/2007 Einav ................. A63B 21/4021
601/33

(Continued)

FOREIGN PATENT DOCUMENTS

| JP | H08-215177 A | 8/1996 |
| JP | 2004-298430 A | 10/2004 |

(Continued)

OTHER PUBLICATIONS

V.S. Ramachandran et al., "Can Mirrors Alleviate Visual Hemineglect?", Medical Hypotheses, vol. 52(4), pp. 303-305 (1999).
E.L. Altschuler et al., "Rehabilitation of Hemiparesis After Stroke with a Mirror", The Lancet, vol. 353, pp. 2035-2036 (Jun. 12, 1999).
K. Sathian et al., "Doing It with Mirrors: A Case Study of a Novel Approach to Neurorehabilitation", Neurorehabilitation and Neural Repair, vol. 14, pp. 73-76 (2000).

(Continued)

*Primary Examiner* — Eddy Saint-Vil
(74) *Attorney, Agent, or Firm* — Harness, Dickey & Pierce, P.L.C.

(57) ABSTRACT

A motion training device includes: a display on which a user can visually recognize a training target site as a part of a body part of the user in the state where motion images is displayed; and a controller which causes the display to display motion images that appears as if the training target site is moving, at a different position from a position of the training target site of the user.

14 Claims, 7 Drawing Sheets

(56) References Cited

U.S. PATENT DOCUMENTS

| | | | |
|---|---|---|---|
| 2008/0306572 A1 | 12/2008 | Osada et al. | |
| 2010/0079356 A1* | 4/2010 | Hoellwarth | G06F 3/16 345/8 |
| 2014/0198033 A1* | 7/2014 | Kobayashi | G06F 3/012 345/156 |
| 2015/0054850 A1 | 2/2015 | Tanaka | |
| 2015/0098143 A1* | 4/2015 | Anderson | G03B 21/10 359/839 |
| 2015/0099252 A1* | 4/2015 | Anderson | G09B 19/003 434/257 |
| 2016/0049089 A1* | 2/2016 | Witt | G09B 19/0038 434/258 |
| 2016/0249008 A1 | 8/2016 | Kitazawa et al. | |
| 2017/0139482 A1* | 5/2017 | Ahn | G06F 3/017 |

FOREIGN PATENT DOCUMENTS

| | | |
|---|---|---|
| JP | 2009-213500 A | 9/2009 |
| JP | 2015-039522 A | 3/2015 |
| JP | 2016-158056 A | 9/2016 |
| JP | 2016-158057 A | 9/2016 |

OTHER PUBLICATIONS

J.A. Stevens et al., "Brief Report: Using Motor Imagery in the Rehabilitation of Hemiparesis", Arch. Phys. Med. Rehabil., vol. 84, pp. 1090-1092 (Jul. 2003).

\* cited by examiner

FIG. 7

# MOTION TRAINING DEVICE, PROGRAM, AND DISPLAY METHOD

BACKGROUND

Technical Field

The present disclosure relates to motion training.

Related Art

JP-A-2004-298430 discloses a technique of allowing a patient to visually recognize motion images which reproduces a missing body part as realistically as possible for the treatment of phantom limb pain. JP-A-2004-298430 discloses applying this technique to the treatment of paralysis.

In the related-art technique, the user is allowed to visually recognize motion images that are as realistic as possible. Therefore, when the technique is used for motion training of a body part that is not missing, the motion images is displayed so as to be superimposed on a training target site that is a body part of the user. Thus, it is difficult to compare the body part of the user and the motion images, and therefore the training is not effective.

SUMMARY

An advantage of some aspect of the disclosure is to solve the problems described above, and the disclosure can be implemented as the following configurations.

An aspect of the disclosure is directed to a motion training device including: a display on which a user is capable of visually recognizing a training target site as a part of a body part of the user in the state where motion images is displayed; and a controller which causes the display to display motion images that appears as if the training target site is moving, at a different position from a position of the training target site of the user. With this configuration, the motion images are displayed at a different position from the position of the training target site of the user. Therefore, it is easier to compare the body part of the user with the motion images.

The motion training device may be a head-mounted display device. With this configuration, the device is conveniently portable and enables training without needing a large space.

In the motion training device, the display may be an optical transmission-type display. With this configuration, the user can actually see the training target site as a body part of the user. Therefore, it is easier to compare the body part of the user with the motion images.

The motion training device may further include a camera which captures an image of a real space. The display may be a video see-through display. The controller may cause the display to display the training target site whose image is picked up by the camera, corresponding to a position of the training target site in the real space. With this configuration, the display is a video see-through display and blocks unwanted external light. Therefore, the user can concentrate on training.

In the motion training device, the training target site may be one hand. With this configuration, the user can carry out training of the one hand effectively.

In the motion training device, the training target site may be both hands. The controller may cause the motion images to be displayed between both hands of the user. With this configuration, in the case where the target site is both hands, the motion images can be displayed at a position which the user can easily see, considering the positions of both hands of the user.

In the motion training device, the controller may cause the training target site displayed as the motion images to be displayed so as to look smaller than the training target site of the user. With this configuration, the motion images are easier to see.

In the motion training device, the controller may cause the motion images to be displayed so as to avoid overlapping the training target site of the user. With this configuration, it is easier to compare the body part of the user with the motion images.

The disclosure can be implemented in various configurations other than those described herein. For example, the disclosure can be realized in configurations such as a display method, a program for realizing this method, and a non-temporary storage medium storing this program.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
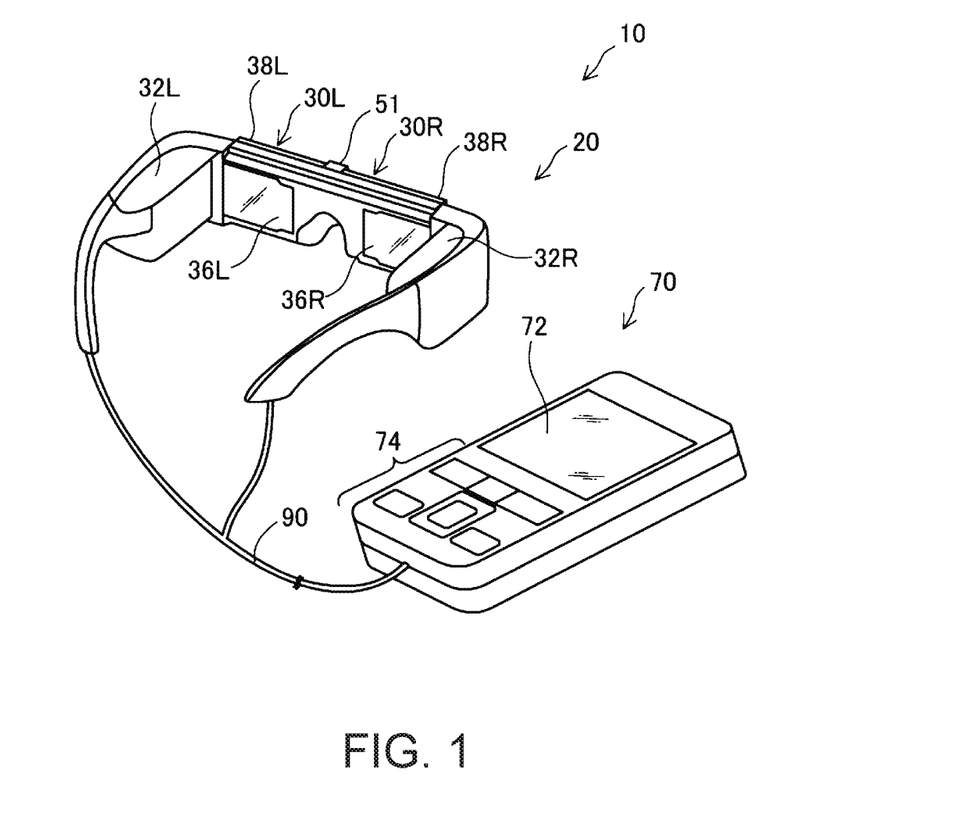
FIG. 1 shows the configuration of a Head Mounted Display (HMD).

FIG. 1 shows the configuration of a Head Mounted Display (HMD) 10. The term "HMD" is an abbreviation of head mounted display. The HMD 10 executes display processing, described later, and thus realizes a display method for motion training and functions as a motion training device. Motion training is carried out, for example, for rehabilitation of a hand (hereinafter also referred to as rehab).

The HMD 10 is an optical transmission-type (optical see-through) display on which the user can simultaneously see both a virtual image and real space.

The HMD 10 includes a display device 20 shaped like eyeglasses, and a controller 70. The display device 20 and the controller 70 are connected via a wire or wirelessly so as to be able to communicate with each other. In this embodiment, the display device 20 and the controller 70 are connected via a cable 90. The controller 70 communicates a signal of an image (image signal) and a signal for control (control signal) with the display device 20 via the cable 90.

The display device 20 has a left-eye display 30L and a right-eye display 30R. The left-eye display 30L includes a left-eye output 32L, a left-eye light guide 34L (FIG. 2), a left-eye reflector 36L, and a left-eye shade 38L. The right-eye display 30R includes a right-eye output 32R, a right-eye light guide (not shown), a right-eye reflector 36R, and a right-eye shade 38R. The right-eye light guide has a configuration similar to that of the left-eye light guide 34L.

Figure 2:
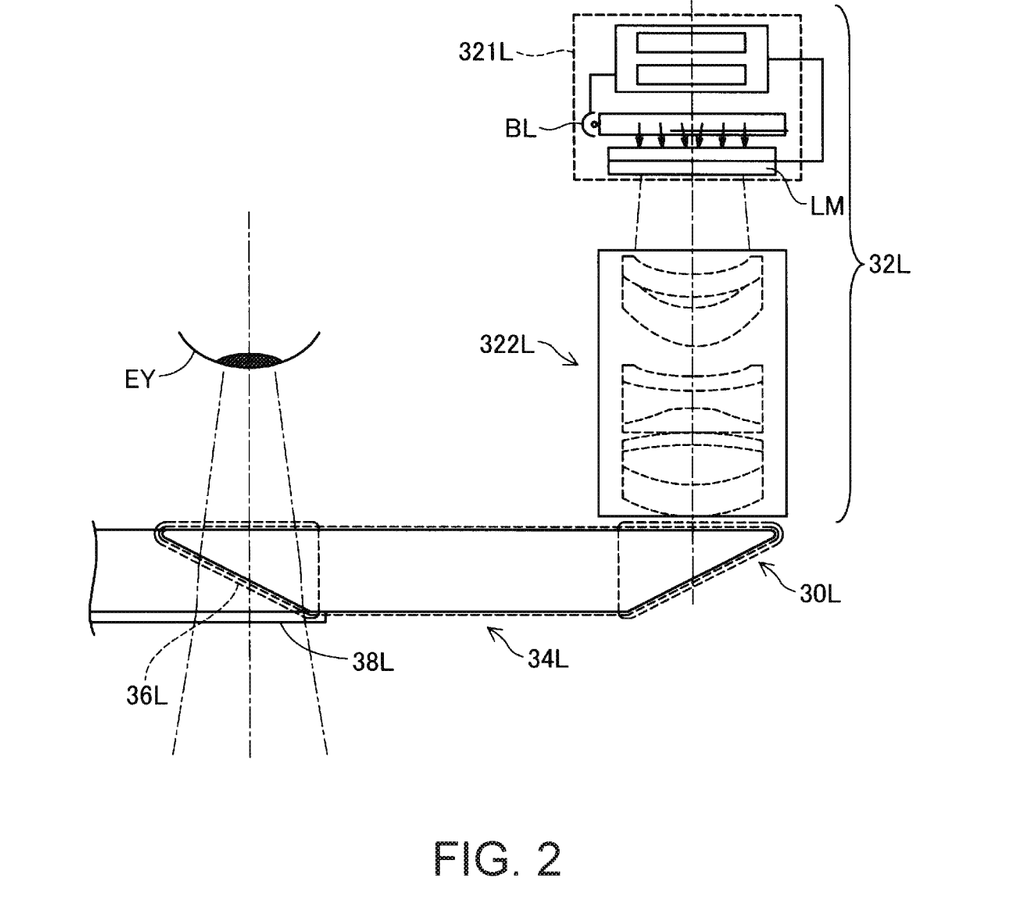
FIG. 2 shows the configuration of a left-eye display.

FIG. 2 shows details of the configuration of the left-eye display 30L. FIG. 2 shows the left-eye display 30L, as viewed from directly above. The left-eye output 32L is arranged at the base of the temple of the eyeglasses and includes a left-eye image generator 321L and a left-eye projection system 322L.

The left-eye image generator 321L includes a left-eye backlight light source BL and a left-eye light modulation element LM. In this embodiment, the left-eye backlight light source BL is made up of a set of light sources corresponding to the individual light emission colors of red, green, and blue. For example, a light emitting diode (LED) or the like can be used as each light source. In the embodiment, the left-eye light modulation element LM is made up of a liquid crystal display device, which is a display element.

The left-eye display 30L functions as follows. When an image signal for the left eye is inputted to the left-eye image generator 321L from the controller 70 (see FIG. 1), the individual light sources of the left-eye backlight light source BL emit red light, green light, and blue light. The red light, green light, and the blue light emitted from the individual light sources are dispersed and become incident on the left-eye light modulation element LM. The left-eye light modulation element LM spatially modulates the red light, the green light, and the blue light which are projected thereon, according to an image signal inputted to the left-eye image generator 321L from the controller 70, and thus emit an image light corresponding to the image signal.

The left-eye projection system 322L is made up of, for example, a projection lens set, and turns the image light emitted from the left-eye light modulation element LM of the left-eye image generator 321L into a parallel luminous flux. The image light, turned into the parallel luminous flux by the left-eye projection system 322L, becomes incident on the left-eye light guide 34L.

The left-eye light guide 34L guides the image light from the left-eye projection system 322L, to a semitransparent reflection surface of a triangular prism provided in the left-eye reflector 36L. Of the front and back sides of the semitransparent reflection surface, the side facing the left eye EY of the user when the user wears the HMD is provided with a reflection coating such as a mirror layer. This surface with the reflection coating totally reflects the image light guided to the semitransparent reflection surface at an image extraction area of the left-eye reflector 36L. The reflected image light enters the left eye EY of the user. Consequently, the left eye EY of the user sees a virtual image. In this embodiment, making the user perceive a virtual image is also expressed as displaying an image.

At least part of the light incident on the left-eye reflector 36L from the real space (e.g., the surrounding environment) is transmitted through the semitransparent reflection surface of the left-eye reflector 36L and is guided to the left eye EY of the user. Thus, the user sees the image displayed by the left-eye output 32L and the optical image from the real space simultaneously so that the image displayed by the left-eye output 32L appears superimposed over the image from the real space.

As shown in FIG. 1, the right-eye display 30R has a configuration similar to that of the left-eye display 30L with left-right symmetry, and functions similarly to the left-eye display 30L.

In accordance with the foregoing configuration, the user can simultaneously see the image displayed in the image extraction area of the display device 20 and the real space. The image thus displayed provides the user with augmented reality (AR).

The left-eye shade 38L is arranged on the side of the left-eye light guide 34L that is opposite to the left eye EY of the user. The left-eye shade 38L in the embodiment is removable. The left-eye shade 38L blocks light so that the light will not be incident on the semitransparent reflection surface from the real space. Therefore, when the left-eye shade 38L is attached, the user can clearly see the image displayed by the left-eye output 32L.

In the display device 20, a camera 51 is provided at a position corresponding to the glabella of the user when the user wears the display device 20 (proximate the bridge/top bar area of the HMD 10). Therefore, in the state where the user wears the display device 20 on the head, the camera 51 picks up an image of the real space in the direction in which the user faces. The camera 51 in this embodiment is a single-lens camera. The camera 51 in another configuration can be a stereo camera.

The controller 70 controls the display device 20. The controller 70 includes a touch pad 72 and an operation buttons 74. The touch pad 72 detects a touch operation on an operation surface of the touch pad 72 and outputs a signal corresponding to the detection content. Various touch pads such as electrostatic types, pressure detection types, and optical types can be employed as the touch pad 72. The operation buttons 74 include various operation buttons, and detect inputs on the respective operation buttons and output signals corresponding to the detection contents. The controller 70 is merely exemplary and other types of controls and input mechanisms may be substituted therefore.

Figure 3:
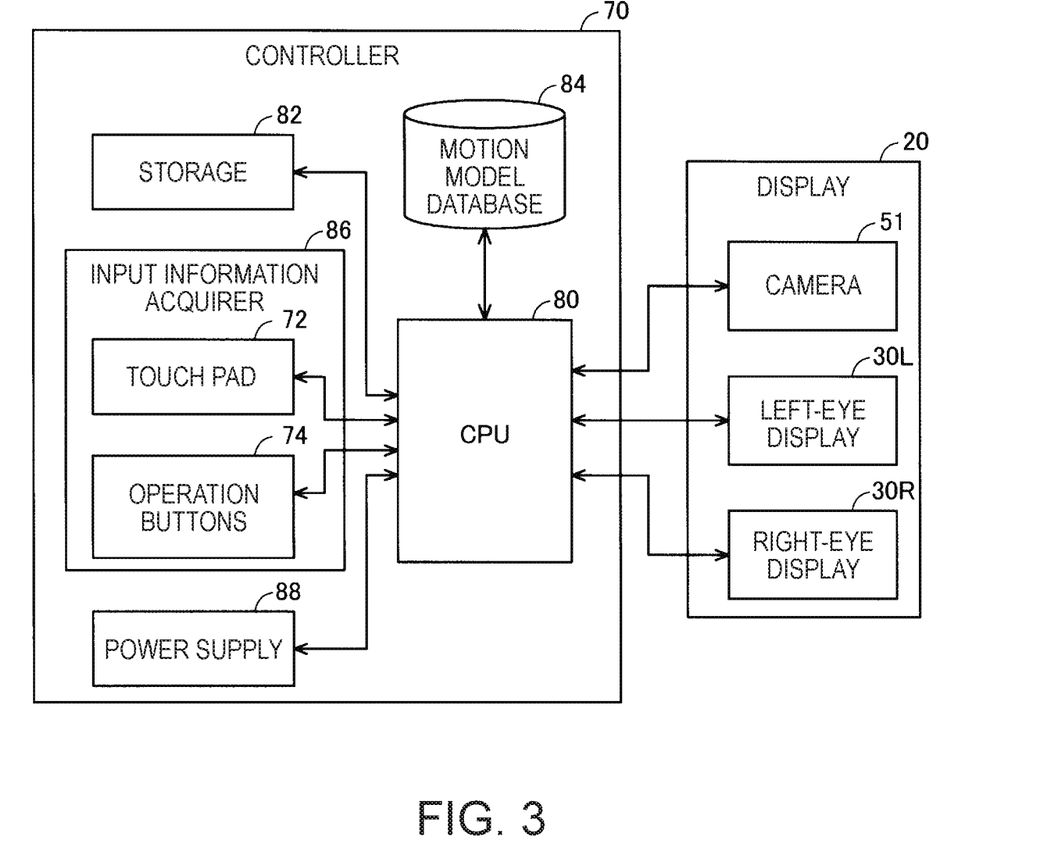
FIG. 3 is a functional block diagram of the HMD.

FIG. 3 is a functional block diagram of the HMD 10. The controller 70 includes a CPU 80, storage 82, a motion model database 84, an input information acquirer 86, and a power supply 88. The individual components are connected to each other via a bus or the like.

The storage 82 is made up of a ROM, RAM, DRAM, hard disk or the like. Various programs including an operating system (OS) and a program for display processing are stored in the storage 82.

The motion model database 84 is a database in which motion models are accumulated. A motion model is motion images data which models a motion of a training target site. In this embodiment, motion models for the left hand and motion models for the right hand are accumulated in advance.

The input information acquirer 86 includes the touch pad 72 and the operation buttons 74. The input information acquirer 86 receives input signals corresponding to the detection contents from the touch pad 72 and the operation buttons 74. The power supply 88 supplies electricity to the components provided in the controller 70 and the display device 20.

The CPU 80 reads out and executes the programs stored in the storage 82 and thereby realizes various functions. Specifically, the CPU 80 executes processing corresponding to a detection content of an operation from the input information acquirer 86 when the detection content is input, reads data from and writes data to the storage 82, and controls the supply of electricity to each component from the power supply 88. (In other words, the user operates the input information acquirer 86, the input information is detected, the detection content is input to the CPU 80, and the CPU 80 executes processing corresponding to the detection content.

The CPU 80 reads out and executes programs for display processing stored in the storage 82 and thereby executes the display processing. The execution of the display processing realizes the display method for motion training. The display processing is configured to support the motion training of the user by displaying motion images of a body part with a functional disorder. The user carries out motion training for the rehabilitation of a paralyzed body part based on the displayed motion images.

Figure 4:
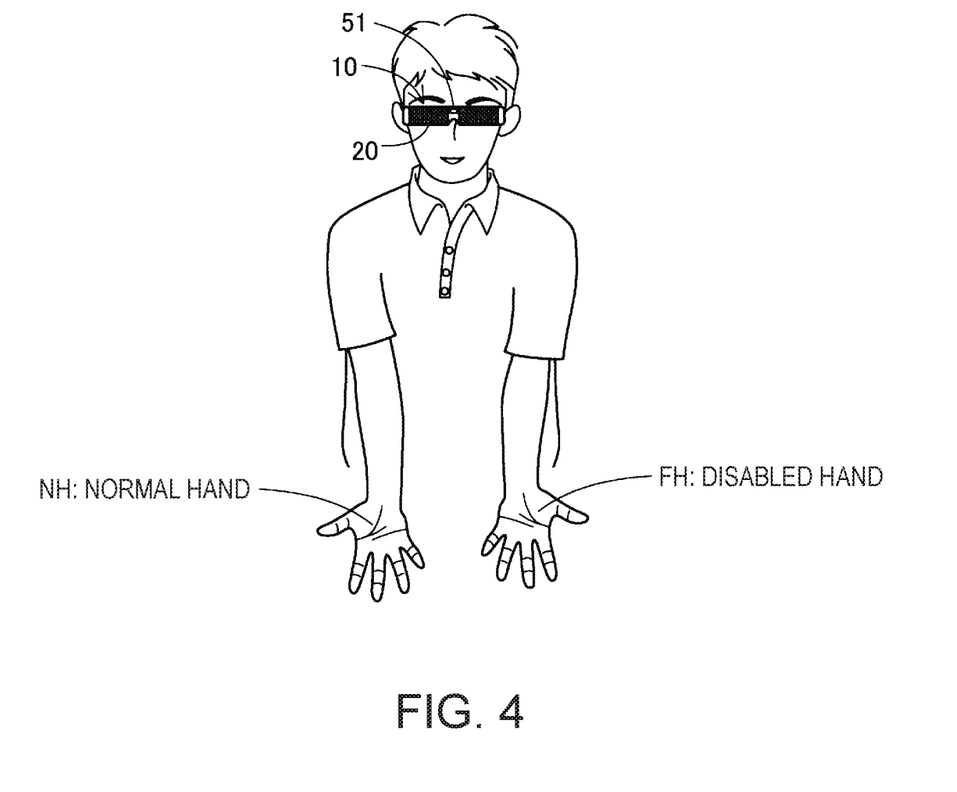
FIG. 4 shows the state of a user wearing the HMD.

FIG. 4 shows the state where the user is wearing the HMD 10. The HMD 10 in this embodiment is employed on the assumption that the user has a functional disorder on at least one hand. The "hand" in this embodiment refers to the entirety of the site from the wrist to the distal end of the hand.

The movement to be a target of motion training in the embodiment is the flexion and extension of the IP joint or the MP joint. The IP joint is the first joint in the case of the first finger (thumb) (the distal interphalangeal joint), and the first and second joints in the case of the second to fifth fingers (the distal interphalangeal joint and the proximal interphalangeal joint). The MP joint is the joint situated at the boundary between the finger and the palm (metacarpophalangeal joint).

The finger to be a rehabilitation target is at least one of the first to fifth fingers of the hand including the finger with a functional disorder. Hereinafter, the hand including the finger with a functional disorder is called the "disabled hand FH", and the hand without a functional disorder is called the "normal hand NH". The term "without a functional disorder" means that the hand is not a rehabilitation target, and in practice, this hand may have a slight functional disorder. In the case of the user shown in FIG. 4, the right hand is a normal hand NH and the left hand is a disabled hand FH.

Figure 5:
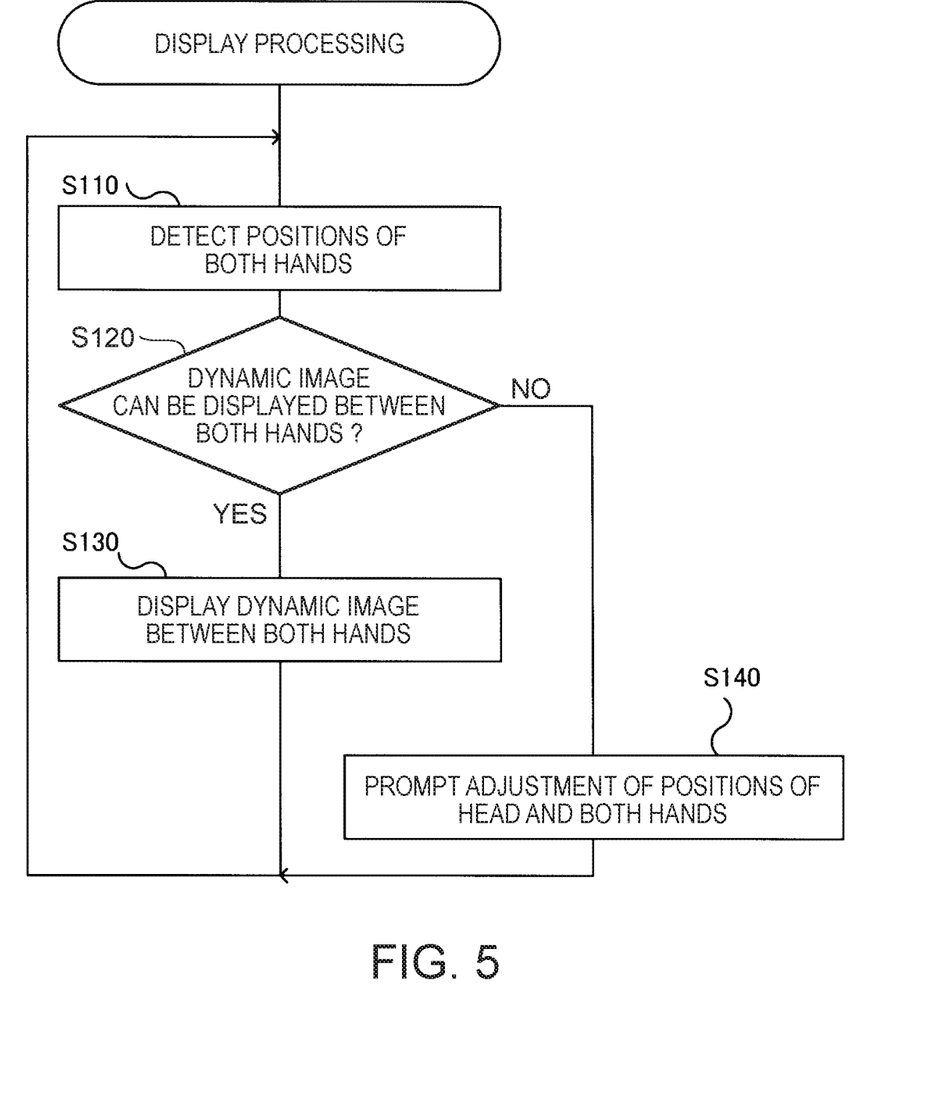
FIG. 5 is a flowchart showing display processing.

FIG. 5 is a flowchart showing the display processing described above. The display processing is started in response to a start instruction input via the operation buttons 74. The display processing is executed repeatedly until an end instruction is inputted via the operation buttons 74. The operation buttons 74 are operated by the user or a training assistant.

First, the CPU 80 detects the positions of both hands of the user (S110). Specifically, the left and right hand parts are extracted respectively from an image picked up by the camera 51, and the contours thereof are specified two-dimensionally.

Next, the CPU 80 determines whether motion images can be displayed between both of the hands or not (S120). A specific determination method will be described later. If motion images can be displayed between both hands (YES in S120), motion images is displayed between both hands (S130) and the processing returns to S110.

Figure 6:
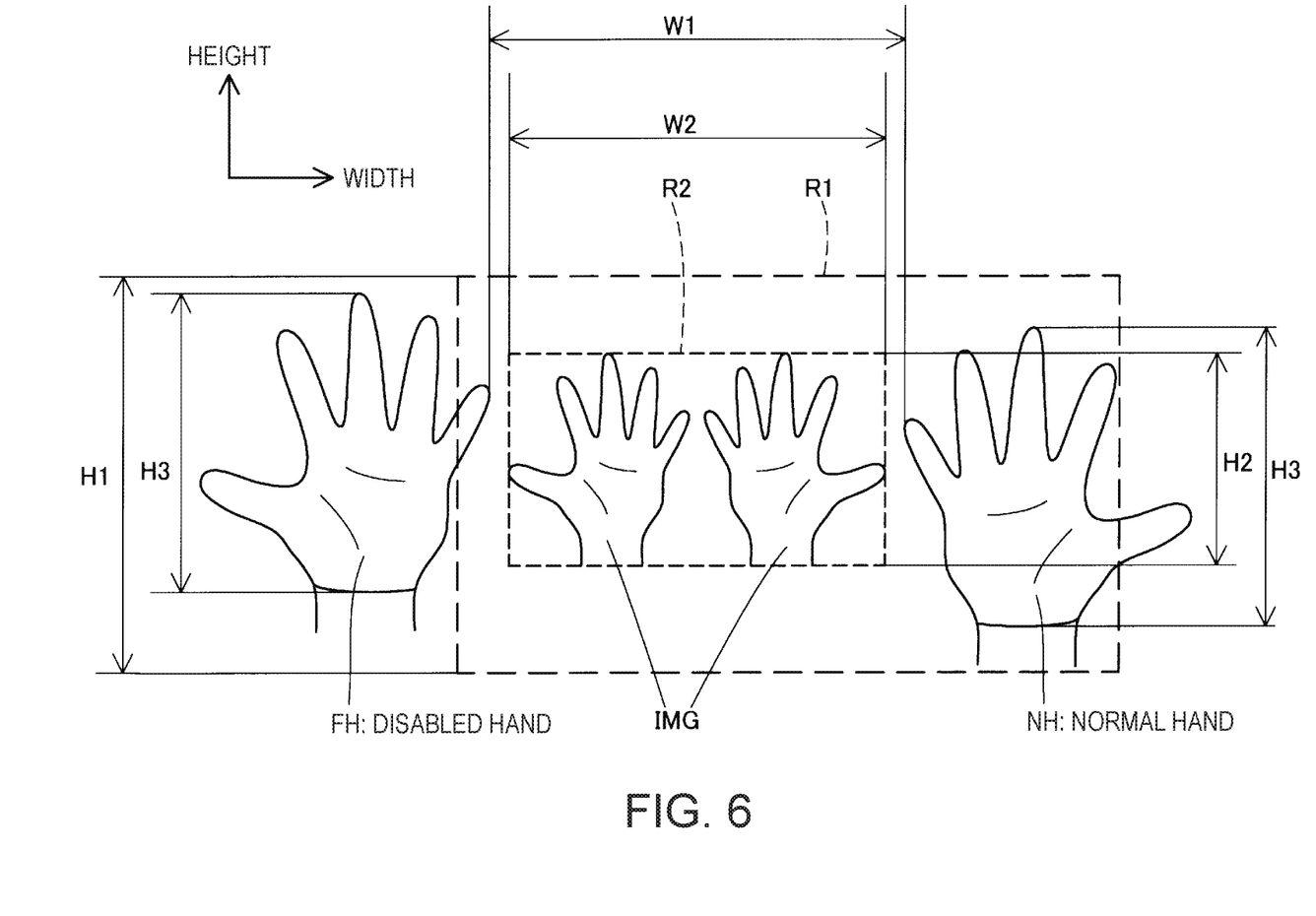
FIG. 6 shows the state where both hands are open during the display processing.
Figure 7:
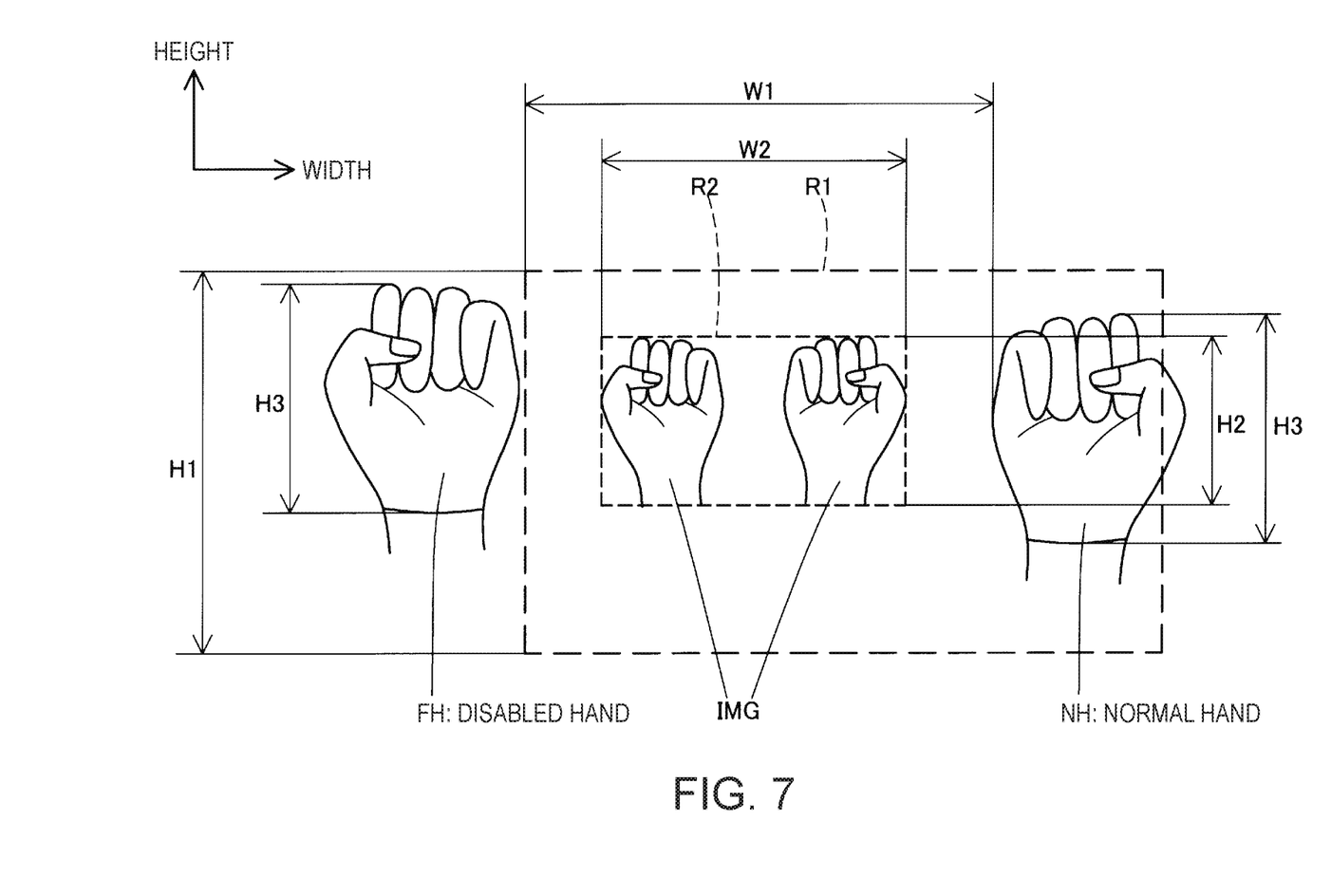
FIG. 7 shows the state where both hands are closed during the display processing.

FIGS. 6 and 7 show the states of images perceived by the user during the display processing. FIG. 6 shows the state where both hands in an open state are displayed as motion images IMG and where both hands of the user are open, too. FIG. 7 shows the state where both hands in a closed state are displayed as motion images IMG and where both hands of the user are closed, too. The user visually recognizes the normal hand NH and the disabled hand FH through the semitransparent reflection surface of the display device 20. The motion images IMG in the embodiment are perceived by the user as three-dimensional images.

Since the motion images IMG are displayed between both hands of the user, the motion images IMG are displayed at different positions than the positions of both hands of the user. In addition, since the motion images IMG are displayed between both hands of the user, the motion images IMG are displayed so as to avoid overlapping either hand of the user. The term "avoid overlapping" means that there are no overlapping sites.

In FIGS. 6 and 7, the contour of a display area R1 is shown. The display area R1 is an area where an image can be displayed. However, the user cannot clearly see the contour of the display area R1. A rectangular area R2 (described later) is a virtual area at which the real space is invisible to the user.

A direction which is along a side of the rectangle as the contour of the display area R1 and in which the right hand and the left hand of the user are arranged next to each other is defined as a width direction. A direction along a side of the rectangle as the contour of the display area R1 and orthogonal to the width direction is defined as a height direction. In the height direction, the fingertip side of the hands of the user is referred to as "top", and the wrist side of the hands of the user is referred to as "bottom".

The positional relationship between the display area R1, and the normal hand NH and the disabled hand FH, is determined by the posture of the user. The posture refers to the three-dimensional positional relationship between the head of the user, and the normal hand NH and the disabled hand FH.

The motion images IMG are configured to show serial movements such as alternating between closing the hands and opening the hands. While the determination of YES is repeated in S120, the display of the motion images IMG is continued.

The user is instructed in advance to close and open his/her hands along with the movements of the motion images. The disabled hand FH is both a rehabilitation target site and a training target site. The normal hand NH is not a rehabilitation target site but is a training target site. The motion training of the normal hand NH as well as the disabled hand FH enhances the effect of the rehabilitation of the disabled hand FH.

The motion images IMG are displayed so that the height H2 of the motion images IMG is shorter than the height H3 of each hand. The height H3 of each hand is a parameter indicating at what height the hand appears to the user. Specifically, H3 is defined as a distance in the height direction and is equal to the distance from the topmost site of the hand to the wrist. Consequently, the hands displayed as the motion images IMG are displayed so that they look smaller than the normal hand NH and the disabled hand FH.

The height H3 of the hand can change according to the posture of the user. In this embodiment, the height H2 of the motion images IMG in the embodiment is a fixed value. Therefore, the height H2 of the motion images IMG is decided in advance so as to be shorter than the height H3 at its minimum. The height H3 at its minimum is the height H3 of the hand in the state where the arm is fully extended. In another configuration, the height H2 may be a variable value and may be set by the training assistant.

Next, the determination in S120 will be described. In the embodiment, the motion images IMG are displayed between both hands so as not to overlap either hand, as described above. In S120, whether there is a sufficient two-dimensional space for displaying the motion images IMG in such a manner or not is determined. Specifically, if the rectangular area R2 satisfies all of the following conditions, the CPU 80 determines YES in S120.

A condition "a" is that the width W2 of the rectangular area R2 is entirely within an overlap width W1. The overlap width W1 refers to the width of an overlapping area among the space between both hands and the display area R1.

A condition "b" is that each of the left and right hands is within the range of the display area R1 in the height direction.

The condition a is a condition for displaying the motion images IMG between the normal hand NH and the disabled hand FH so as not to overlap either of the normal hand NH or the disabled hand FH.

The condition b is a condition for displaying the motion images IMG near the normal hand NH and the disabled hand FH and thus making it easier to compare the motion images IMG with the normal hand NH and the disabled hand FH.

The positions where the motion images IMG are displayed are decided as follows, using the conditions a and b. With respect to the width direction, the center of the rectangular area R2 is set on the center of the overlap width W1. With respect to the height direction, the center of the rectangular area R2 is set on the center of a line from the top end to the bottom end of the left and right hands. The top end of the left and right hands refers to the position of the higher one of the top end of the left hand and the top end of the right hand. The bottom end of the left and right hands refers to the position of the lower one of the left wrist and the right wrist.

The overlap width W1, the width W2 of the rectangular area R2, and the height H3 of the hands change every moment. Therefore, the determination in S120 is carried out based on the state of these parameters at each time point (e.g., continuously). If the detection of the positions of both hands fails, NO is determined in S120. For example, if one of the hands is located outside the image pickup range of the camera, the position of that hand cannot be detected.

If it is determined that the motion images IMG cannot be displayed between both hands (NO in S120), the user is prompted to adjust the positions of the head and both hands (S140). Specifically, a character string such as "Move both hands apart from each other and look between both hands" is displayed as an image. Subsequently, the processing returns to S110.

According to the embodiment described above, motion training targeting both hands can be carried out effectively, using the see-through HMD 10. Also, since the HMD 10 is conveniently portable and does not take a large space, motion training can be easily carried out at home or the like.

The disclosure is not limited to the embodiment, examples and modifications in this specification and can be realized with various configurations without departing from the scope of the disclosure. For example, technical features in the embodiment, examples and modifications corresponding to technical features in each configuration described in the summary section can be suitably replaced or combined in order to solve a part or all of the foregoing problems or in order to achieve apart or all of the foregoing advantageous effects. Such technical features can be suitably deleted unless described as essential in the specification. For example, the following examples can be given.

If both hands are disabled hands FH, the rehabilitation and training target sites may be both hands.

The training target site may be other than both hands. For example, the training target site may be one hand as a disabled hand. Alternatively, the training target site may be both legs or one leg, or may be one foot or both feet. The leg in this case refers to a site from the thigh to the distal end.

The motion images may be displayed at a different position from the position of the training target site of the user. For example, the motion images may be displayed so that it overlaps with the training target site of the user. That is, apart of the motion images may be displayed so as to overlap the training target site of the user. Alternatively, if the training target site is both hands, the motion images may be displayed at a position that is not between both hands (for example, above each of the left and right hands). The motion images may be of parts other than both hands. For example, the motion images may be of one hand as a disabled hand. Alternatively, the motion images may be of both legs or one leg, or may be of one foot or both feet. If the motion images are of one hand, the position of the one hand is detected and whether the motion images can be displayed at a position not overlapping the one hand or not is determined. If the motion images can be displayed at a position not overlapping the one hand, the motion images is displayed at the position not overlapping the one hand.

The motion training device may be a video see-through HMD. In the case where the video see-through HMD is used, a training target site as a body part of the user whose image is picked up by the camera may be displayed corresponding to its position in the real space.

The motion training device may be other than the HMD. For example, it may be a tablet terminal or a smartphone. In the case where such a display terminal is used, for example, the display terminal may be arranged between both hands and motion images which appear as if the training target site is moving may be displayed at a different position from the position of the training target site of the user.

The motion training may be carried out for the treatment of phantom limb pain. For example, a patient who has a thumb missing and perceives phantom limb pain may carry out the motion training for the treatment of the phantom limb pain.

In the case where the see-through HMD is used as in the embodiment, the function of adjusting the display position of the motion images may be absent. Even in this case, motion images which appears as if the training target site is moving can be displayed at a different position from the position of the training target site of the user if the user adjusts his/her posture.

The motion images IMG may be displayed in the form of an image perceived as two-dimensional.

In the embodiment, a part or all of the functions and processing realized by software may be realized by hardware. Also, a part or all of the functions and processing realized by the hardware may be realized by software. As the hardware, for example, various circuits such as an integrated circuit, a discrete circuit, or a circuit module formed by a combination of these circuits, may be used.

The entire disclosure of Japanese Patent Application No. 2016-192596 filed Sep. 30, 2016 is expressly incorporated by reference herein.

What is claimed is:

1. A motion training device comprising:
a camera configured to capture an image of a real space containing two body parts of a user;
a display configured to display a training target site and motion images, the training target site corresponding to the two body parts of the user, the motion images being a virtual representation of the two body parts; and
a controller communicably coupled to the camera and the display and configured to cause the motion images to selectively repeatedly perform desired training movements,
wherein the controller is configured to;
detect a position of the two body parts of the user by extracting the two body parts from the image captured by the camera;
determine whether the motion images can be displayed between the two body parts;
display the motion images between the two body parts when it is determined that the motion images can be displayed between the two body parts; and prompt the user to adjust at least one of the camera and the two body parts when it is determined that the motion images cannot be displayed between the two body parts.

2. The motion training device according to claim 1, wherein the display is a video see-through display, and when the controller causes the video see-through display to display the motion images between the two body parts, at least part of the two body parts in the real space is visible by the user through the video see-through display.

3. The motion training device according to claim 1, wherein the two body parts correspond to two hands of the user.

4. The motion training device according to claim 1, wherein the controller causes the motion images to appear smaller than the two body parts of the user on the display.

5. The motion training device according to claim 1, wherein the controller causes the motion images to be entirely spaced apart from the two body parts on the display.

6. A display method comprising:
   capturing an image of a real space containing two body parts of a user by a camera;
   displaying a training target site and motion images on a display, the training target site corresponding to the two body parts of the user, the motion images being a virtual representation of the two body parts:
     causing the motion images to selectively repeatedly perform desired training movements on the display;
   detecting a position of the two body parts of the user by extracting the two body parts from the image captured by the camera:
   determining whether the motion images can be displayed between the two body parts;
   displaying the motion images between the two body parts when it is determined that the motion images can be displayed between the two body parts, and
   prompting the user to adjust at least one of the camera and the two body parts when it is determined that the motion images cannot be displayed between the two body parts.

7. The display method according to claim 6, further comprising:
   displaying the motion images between the two body parts on a video see-through display as the display, wherein at least part of the two body parts in the real space is visible by the user through the video see-through display.

8. The display method according to claim 6, wherein the two body parts correspond to two hands of the user.

9. The display method according to claim 6, further comprising causing the motion images to appear smaller than the two body parts of the user on the display.

10. The display method according to claim 6, further comprising causing the motion images to be entirely spaced apart from the two body parts on the display.

11. A display method comprising:
    providing a camera to a user;
    providing a display to the user;
    capturing an image of a real space containing two body parts of the user with the camera;
    detecting a position of the two body parts of the user by extracting the two body parts from the image captured by the camera;
    determining whether motion images can be displayed between the two body parts;
    displaying the motion images between the two body parts when it is determined that the motion images can be displayed between the two body parts; and
    prompting the user to adjust at least one of the camera and the two body parts when it is determined that the motion images cannot be displayed between the two body parts,
    wherein the motion images is a virtual representation of at least one of the two body parts.

12. The display method according to claim 11 wherein the determining step further comprises:
    confirming that the motion images can be displayed entirely between the two body parts such that no overlapping exists among the motion images and the two body parts.

13. The display method according to claim 11 further comprising:
    selectively causing the motion images to repeatedly perform desired training movements.

14. The display method according to claim 11 further comprising:
    making the motion images appear smaller than the two body parts on the display.

* * * * *